United States Patent
Koch et al.

(10) Patent No.: US 10,738,655 B2
(45) Date of Patent: Aug. 11, 2020

(54) TURBINE OUTLET FLOW CONTROL DEVICE

(71) Applicant: GM Global Technology Operations LLC, Detroit, MI (US)

(72) Inventors: Calvin K. Koch, Bloomfield Hills, MI (US); Marc L. Friedrich, Rochester Hills, MI (US); Anil Yadav, Bangalore (IN); John A. Schultz, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 160 days.

(21) Appl. No.: 15/988,529

(22) Filed: May 24, 2018

(65) Prior Publication Data

US 2019/0360358 A1 Nov. 28, 2019

(51) Int. Cl.
*F01D 25/24* (2006.01)
*F01N 3/10* (2006.01)
*F02B 37/00* (2006.01)

(52) U.S. Cl.
CPC ............... *F01D 25/24* (2013.01); *F01N 3/10* (2013.01); *F02B 37/00* (2013.01); *F05D 2220/40* (2013.01)

(58) Field of Classification Search
CPC . F01D 25/24; F01N 3/10; F02B 37/00; F05D 2220/40
See application file for complete search history.

(56) References Cited

U.S. PATENT DOCUMENTS

| | | | |
|---|---|---|---|
| 2004/0071550 A1* | 4/2004 | Martin | F01D 9/026 415/205 |
| 2010/0071676 A1* | 3/2010 | Arvan | F01M 13/0405 123/573 |
| 2013/0019583 A1* | 1/2013 | Lo | F01D 25/30 60/39.5 |
| 2015/0000273 A1* | 1/2015 | Di Martino | F02B 37/18 60/605.1 |
| 2017/0107885 A1* | 4/2017 | Tabata | F01N 3/2803 |
| 2019/0257330 A1* | 8/2019 | Hill | B01D 53/944 |

* cited by examiner

*Primary Examiner* — Brandon D Lee

(57) ABSTRACT

A turbocharger for an internal combustion engine having a close coupled catalyst assembly includes a turbine housing having a toroidal-shaped low pressure exhaust gas chamber having a plurality of vanes disposed proximate the outer circumferential wall of the low pressure exhaust gas chamber. The vanes are arranged to disrupt the rotational flow of the exhaust gases as they exit the turbine housing to provide a more even flow though the catalyst element of the close coupled catalyst assembly.

15 Claims, 5 Drawing Sheets

TURBINE OUTLET FLOW CONTROL DEVICE

INTRODUCTION

The present disclosure relates to internal combustion engines and more specifically to power improvement devices for internal combustion engines.

Internal combustion engines (ICE), whether fueled by gasoline, ethanol, diesel, or other hydrocarbon based fuel, produce exhaust gases that include NOx, CO2, VOCs, CO, toxics, particulates, water, etc. Manufacturers of vehicles that use ICEs take means to clean exhaust gases prior to releasing the exhaust gases into the atmosphere. Cleaning exhaust gases may be accomplished with a catalyst assembly which uses reacting elements deposited onto a ceramic carrier placed in the flowpath of the exhaust gases. The performance of the reacting elements improves with increasing temperatures. As a result, the closer to the source of the exhaust gases the catalyst is placed the high efficiency the catalyst will perform. Additionally, how the exhaust gases flow through the catalyst assembly is of great importance. Even flow of exhaust gases through the ceramic carrier ensures that all of the reacting elements are in contact with the constituents of the exhaust gases Today's ICE are improving in fuel efficiency and power output by reducing the displaced volume and adding power improvement devices such as superchargers, turbochargers, variable valve timing, etc. Turbochargers in particular are challenging for vehicle designers to package because of their size and the connections that are required. For example, turbochargers need to have communication access to both the exhaust system and the air intake system. Thus, it is even more imperative to locate the catalyst system as close as possible to the turbocharger to maintain high temperatures in the catalysts. However, the challenge remains to maintain even flow characteristics through the catalyst assembly.

While today's ICE accomplish many of the goals that they are designed for, increasing cost efficiency, fuel efficiency, and emissions standards have rendered these accomplishments less effective. Accordingly, there is a need in the art for an improved ICE that improves fuel efficiency, increases power output while addressing ever constricting emission standards.

SUMMARY

The present disclosure includes a turbocharger for an internal combustion engine. The turbocharger includes a compressor housing, a turbine housing, a shaft, and a catalyst assembly. The compressor housing is mounted to the internal combustion engine between a first and a second bank of cylinders of the internal combustion engine. The compressor housing includes a fresh air inlet, a compressed air outlet, and a compressor wheel. The turbine housing is axially connected to the compressor housing.

The turbine housing includes an exhaust gas inlet, a high pressure exhaust gas chamber, a low pressure exhaust gas chamber, an exhaust gas outlet, and a turbine wheel. The exhaust gas outlet chamber includes at least a first and second vanes disposed proximate an outer circumferential wall of the low pressure exhaust gas chamber. The shaft is connected to the compressor wheel and the turbine wheel for common rotation. The catalyst assembly is axially connected to the exhaust gas outlet of the turbine housing.

In another example of the present disclosure, the first and second vanes of the low pressure exhaust gas chamber are disposed in the low pressure exhaust gas chamber at an angle $\alpha$ relative to a line perpendicular to the outer circumferential wall of the low pressure exhaust gas chamber.

In yet another example of the present disclosure, the angle $\alpha$ between each of the first and second vanes and the line perpendicular to the outer circumferential wall of the low pressure exhaust gas chamber is between +45° and −45°.

In yet another example of the present disclosure, the angle $\alpha$ between each of the first and second vanes and the line perpendicular to the outer circumferential wall of the low pressure exhaust gas chamber is between +25° and −25°.

In yet another example of the present disclosure, the low pressure exhaust gas chamber is toroidal-shaped.

In yet another example of the present disclosure, the catalyst assembly includes a cylindrical-shaped catalyst element having an exhaust gas inlet end and an exhaust gas outlet end. The exhaust gas inlet end is axially oriented with the low pressure exhaust gas chamber and the exhaust gas outlet of the turbine housing.

In yet another example of the present disclosure, the high pressure chamber of the turbine housing has a toroidal shape.

In yet another example of the present disclosure, the exhaust gas inlet of the turbine housing is disposed tangentially to the high pressure chamber of the turbine housing.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

Figure 1:
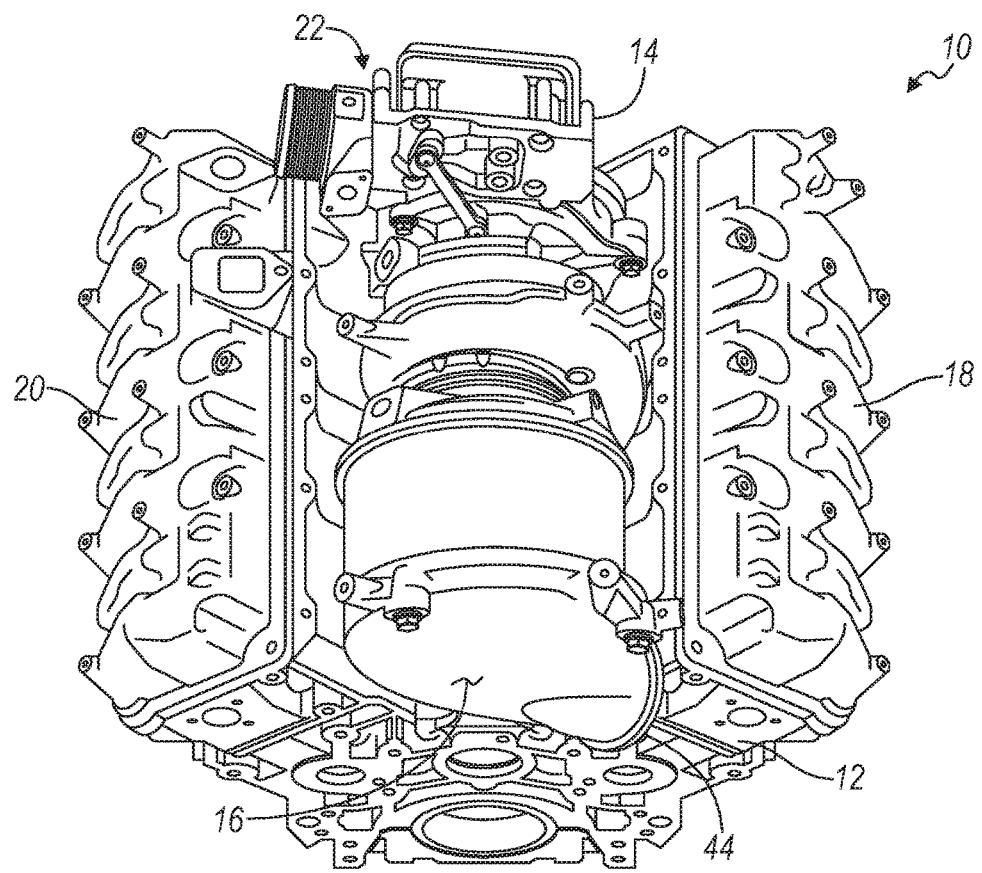
FIG. 1 is a perspective top view of an internal combustion engine system according to the principles of the present disclosure.

Referring to the drawings, wherein like reference numbers refer to like components, in FIG. 1 an internal combustion engine (ICE) system 10 is illustrated in accordance with the present disclosure and will now be described. The internal combustion engine system 10 includes an engine subassembly 12, a turbocharger 14, and a catalyst assembly 16. While the ICE system 10 may also include other assemblies and subassemblies such as an intake manifold, a throttle body, and exhaust manifolds, the scope of the present disclosure shall include those subassemblies. Specific to FIG. 1, the engine subassembly 12 includes a first bank of cylinders 18 and a second bank of cylinders 20 arranged in the shape of a "V" forming a valley 22. The turbocharger 14 and catalyst assembly 16 are disposed in the valley 22 between the first and second banks of cylinders 18, 20.

Figure 2:
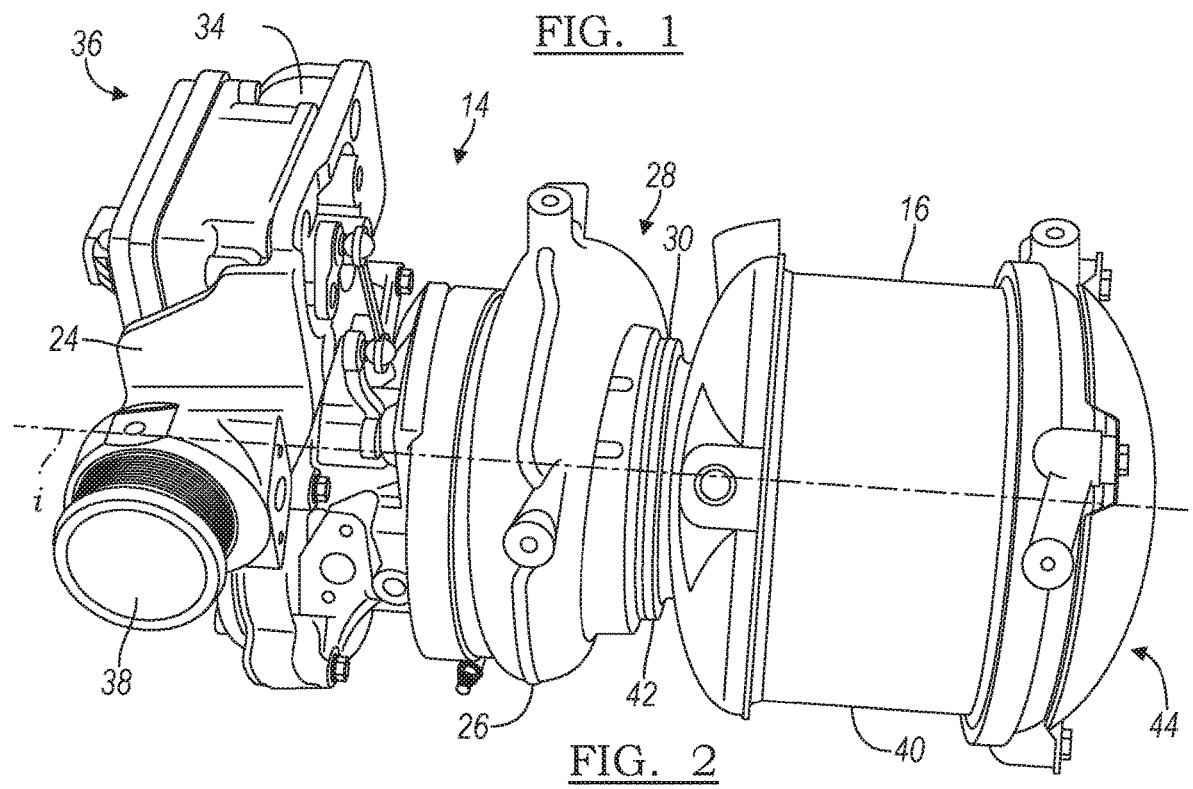
FIG. 2 is a perspective view of a turbocharger and exhaust catalyst according to the principles of the present disclosure.
Figure 3:
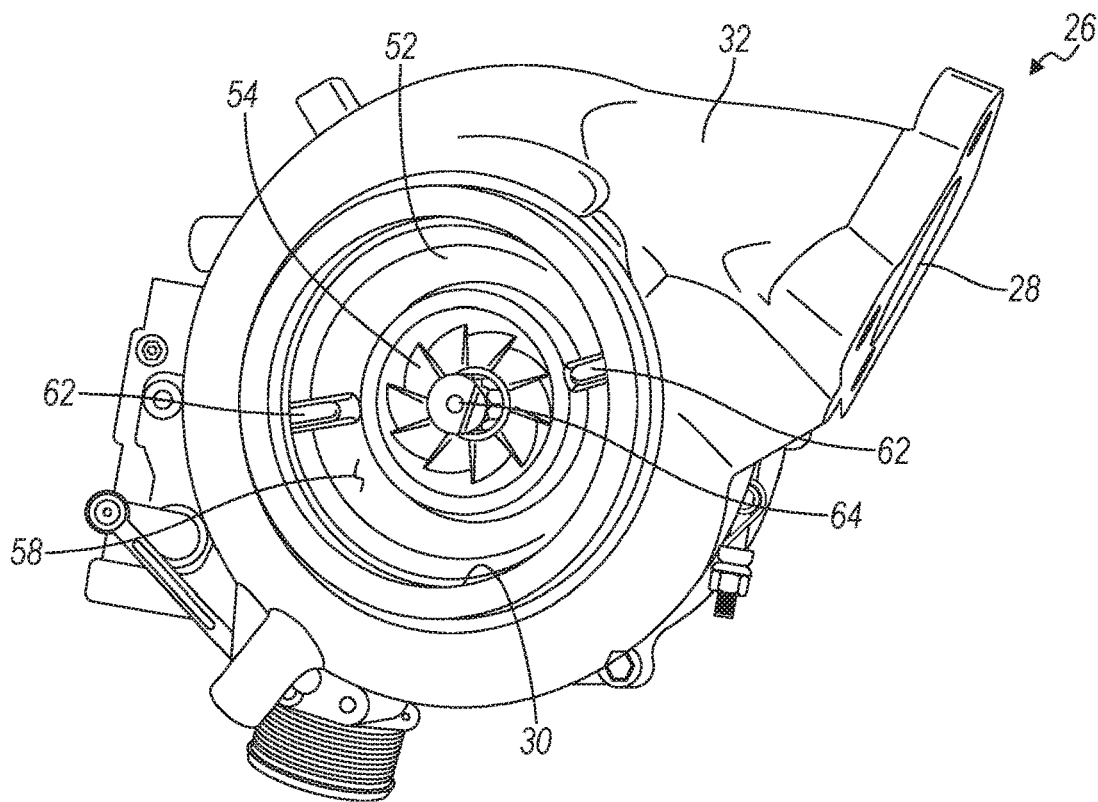
FIG. 3 is a perspective view of an outlet of a turbocharger according to the principles of the present disclosure.
Figure 4:
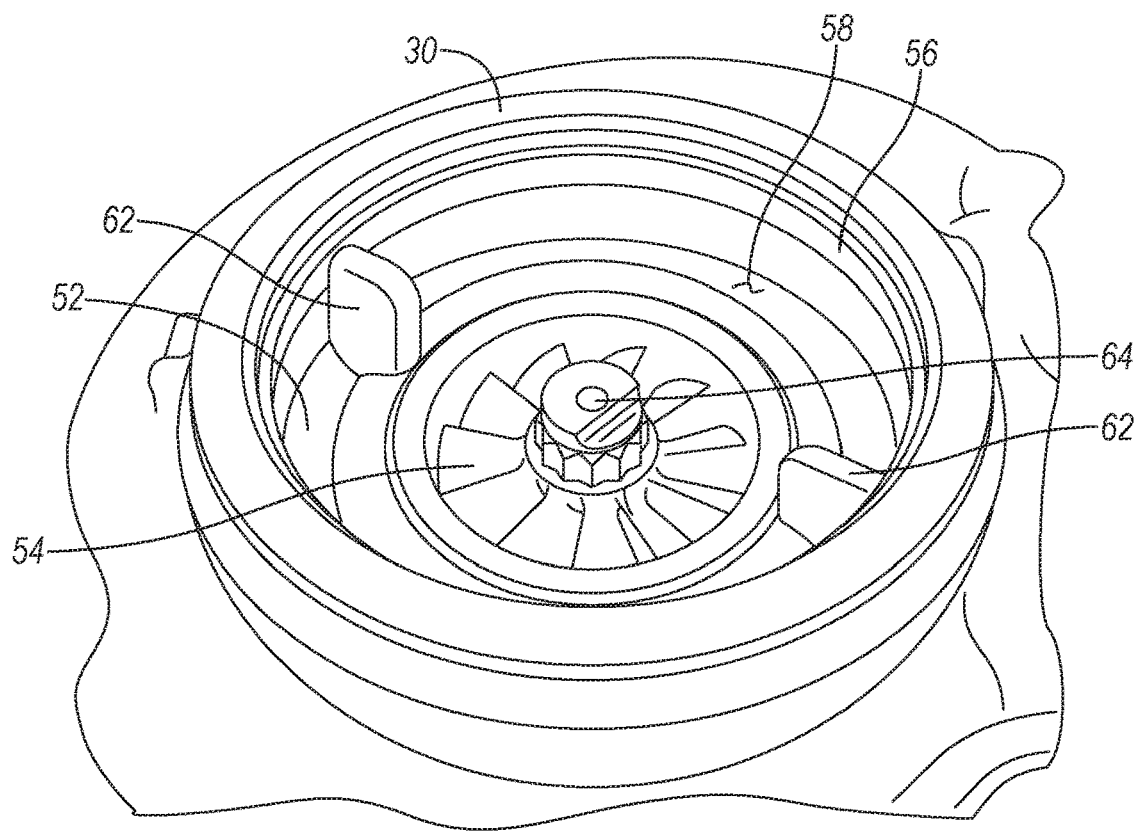
FIG. 4 is a perspective view of an outlet of a turbocharger according to the principles of the present disclosure.
Figure 5:
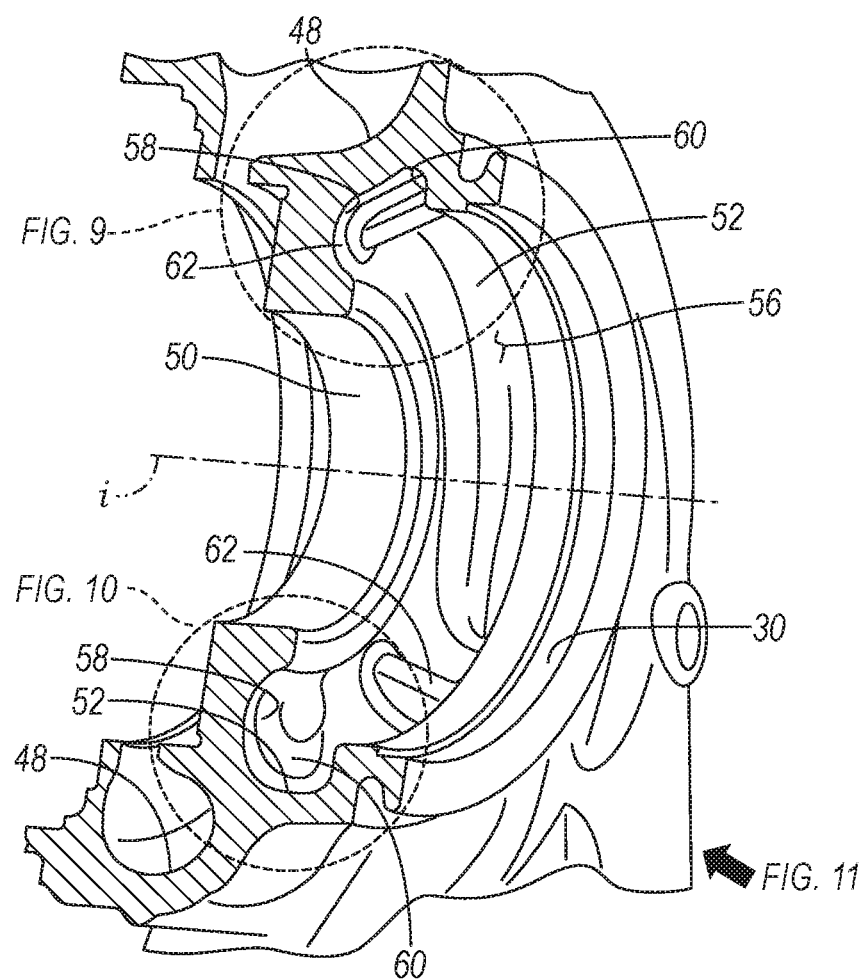
FIG. 5 is a cutaway perspective view of an outlet of a turbocharger according to the principles of the present disclosure.

Referring now to FIG. 2, the turbocharger 14 and catalyst assembly 16 is illustrated in more detail and will now be described. The turbocharger 14 includes a compressor assembly 24 and a turbine assembly 26 connected to each other and axially oriented about an axis i through a shaft 64, shown in FIGS. 3 and 4. A compressor wheel (not shown) is rotatably supported in the compressor assembly 24 and mounted to the shaft which is driven by a turbine wheel 54, shown in FIGS. 3 and 4, rotatably mounted in the turbine assembly 26. More specifically, the turbine assembly 26 has an exhaust gas inlet 28, an exhaust gas outlet 30 integrated into a turbine housing 32. The exhaust gas inlet 28 of the turbine assembly 26, better shown in FIG. 3, is connected to the exhaust manifold (not shown) of the engine assembly 12 and receives high pressured, high flow exhaust gases from the cylinders. The exhaust gases propel the turbine wheel and thus the shaft of the turbocharger 14. Once the exhaust gases pass over the turbine wheel the turbine housing 32 directs the exhaust gases to the exhaust gas outlet 30.

In addition to the compressor wheel, the compressor assembly 24 includes a compressor housing 34 having a fresh air inlet 36 and a compressed air outlet 38. As the shaft of the turbocharger 14 is rotated by the exhaust gases flowing through the turbine wheel, the compressor wheel rotates pressurizing the incoming fresh air between the fresh air inlet 36 and the compressed air outlet 38. The resulting high pressure fresh air is communicated to the cylinders through the intake manifold.

Figure 6:
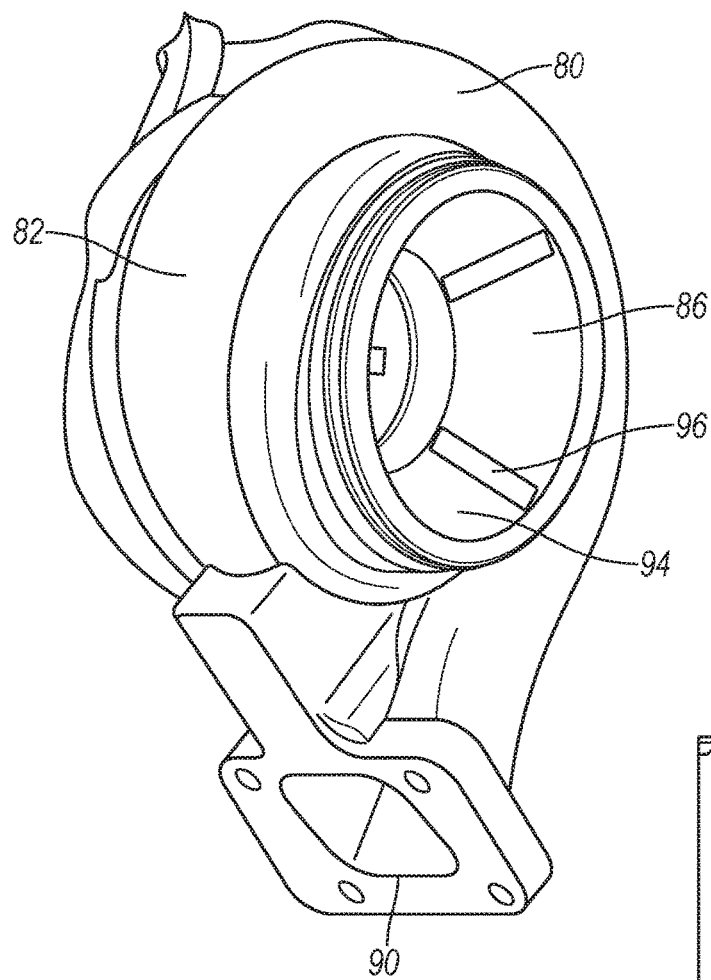
FIG. 6 is a perspective view of an outlet of a turbocharger according to the principles of the present disclosure.

The catalyst assembly 16 includes a catalyst assembly housing 40 having an exhaust gas inlet 42, an exhaust gas outlet 44, and a catalyst element 46, shown as the inside of the catalyst assembly housing 40 in FIG. 6. The exhaust gas inlet 42 receives exhaust gases from the exhaust gas outlet 30 of the turbine assembly 26. Once in the catalyst assembly housing 40, the exhaust gases pass through the catalyst element 46 and are treated. The catalyst element 46 has a cylindrical shape with an internal structure including several channels through which exhaust gas passes. The internal structure is coated with elements that react with the exhaust gases. Once treated, the exhaust gases exit the catalyst assembly housing 40 through the exhaust gas outlet 44 to the remainder of the exhaust system (not shown).

Turning now to FIGS. 3-5 and 8-11, illustrations of the turbine housing 32 are shown and will now be described. The turbine housing 32 includes a toroidal-shaped high pressure exhaust gas chamber 48, a turbine wheel passage 50, and a toroidal-shaped low pressure exhaust gas chamber 52. More specifically, the turbine wheel 54 is rotatably supported by the turbine housing 32 in the turbine wheel passage 50. The exhaust gas inlet 28 is tangentially connected to the high pressure exhaust gas chamber 48. The low pressure exhaust gas chamber 52 is axially connected to the exhaust gas outlet 30. Exhaust gases from the cylinders of the engine subassembly 12 enter the exhaust gas inlet 28 into the high pressure exhaust gas chamber 48, and pass through the turbine wheel passage 50 turning the turbine wheel 54. Once through the turbine wheel passage 50, the exhaust gases collect in the low pressure exhaust gas chamber 52 in a highly rotating flow.

The low pressure exhaust gas chamber 52 includes an outer circumference wall 56, a fore or first chamber wall 58, an aft or second chamber wall 60, and a plurality of vanes or flow disrupters 62. The vanes 62 are disposed on the outer circumference wall 56 connecting each of the fore and aft chamber walls 58, 60. The vanes 62 may be placed at an angle α relative to the outer circumference wall 56. The angle α may range from +45° to −45°. More preferably, the angle α ranges from +25° to −25°. The vanes 62 disrupt the highly rotational flow of the exhaust gases in the low pressure exhaust gas chamber 52. In the present case, the flow of the disrupted exhaust gases flow evenly into the catalyst element 46. In this regard, more of the catalyst element 46 is evenly reacted with exhaust gases over the lifetime of the catalyst element 46 thus extending its useful life without increasing the loading of the catalyst element 46.

Figure 7:
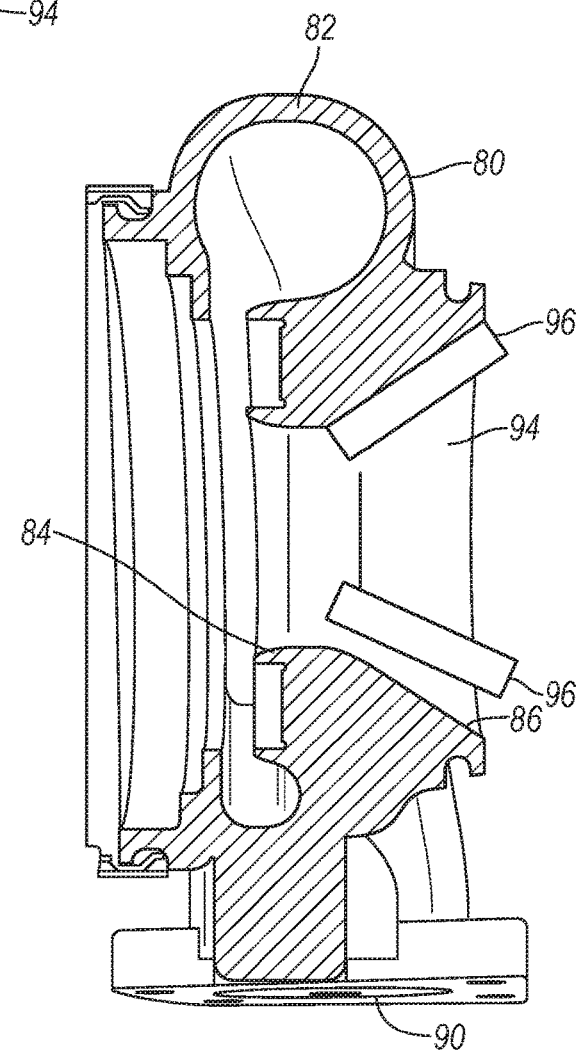
FIG. 7 is a cutaway perspective view of an outlet of a turbocharger according to the principles of the present disclosure.
Figure 8:
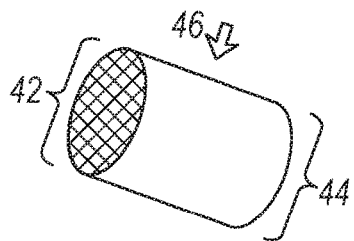
FIG. 8 is a perspective view of a catalyst element according to the principles of the present disclosure.
Figure 9:
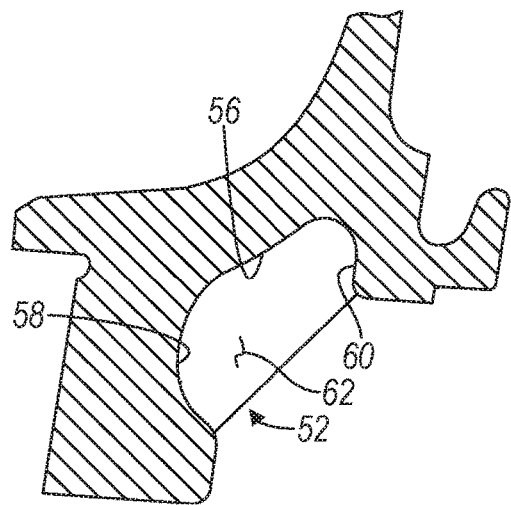
FIG. 9 is a section view of a portion of a turbine housing according to the principles of the present disclosure.
Figure 10:
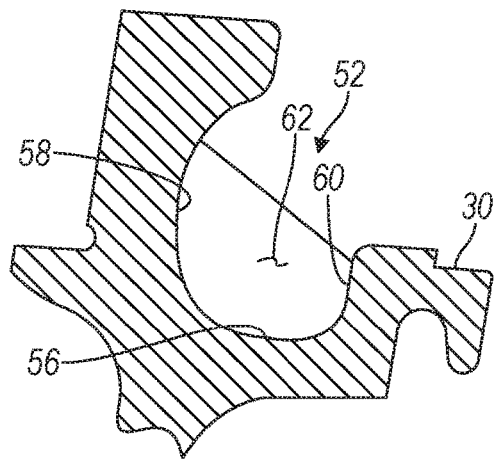
FIG. 10 is a section view of a portion of a turbine housing according to the principles of the present disclosure.
Figure 11:
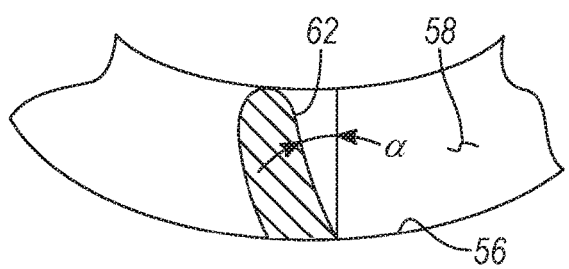
FIG. 11 is a section view of a portion of a turbine housing according to the principles of the present disclosure.

Turning now to FIGS. 6 and 7, another example of the present disclosure is illustrated and will now be described. A turbine housing 80 of a turbocharger includes a toroidal-shaped high pressure exhaust gas chamber 82, a turbine wheel passage 84, and a cone-shaped low pressure exhaust gas duct 86. More specifically, the turbine wheel (note shown) is rotatably supported by the turbine housing 80 in the turbine wheel passage 82. An exhaust gas inlet 90 is tangentially connected to the high pressure exhaust gas chamber 82. The low pressure exhaust gas duct 86 is axially connected to an exhaust gas outlet 92. Exhaust gases from the cylinders of the engine subassembly 12 (FIG. 1) enter the exhaust gas inlet 92 into the high pressure exhaust gas chamber 82, and pass through the turbine wheel passage 84 turning the turbine wheel (not shown). Once through the turbine wheel passage 84, the exhaust gases pass through the low pressure exhaust gas duct 86 in a highly rotating flow.

The low pressure exhaust gas duct 86, having a frusto-conical shape, includes an inner surface 94 having a plurality of ribs or protuberances 96. The ribs 96 are disposed on the inner surface 94 of the low pressure exhaust gas duct 86 in a predominately axial orientation. However, other orientations, dimensions, or shapes of the ribs 96 may be considered without departing from the scope of this disclosure. For example, the ribs may be disposed at an angle λ relative to the axis i. The angle λ may range from +45° to −45°. More preferably, the angle A ranges from +25° to −25°.

While examples have been described in detail, those familiar with the art to which this disclosure relates will recognize various alternative designs and examples for practicing the disclosed method within the scope of the appended claims.

The following is claimed:

1. A turbocharger for an internal combustion engine comprising:
   a turbine housing having an exhaust gas inlet, a first chamber receiving exhaust gas from the exhaust gas inlet, a surface defining a turbine wheel passage receiving exhaust gas from the first chamber, a turbine wheel disposed within the turbine wheel passage and propelled by the exhaust gas, a second chamber receiving exhaust gas from the turbine wheel passage, and an exhaust gas outlet receiving exhaust gas from the second chamber;
   wherein the turbine housing includes an outer circumferential wall, an axially facing first wall, and an axially facing second wall opposite the first wall that define the second chamber in a toroidal shape; and wherein the turbine housing further includes a plurality of vanes surrounded by and connected to the outer circumferential wall, the first wall, and the second wall such that the plurality of vanes disrupt a rotational flow of exhaust gas in the second chamber.

2. The turbocharger of claim 1 wherein the plurality of vanes of the second chamber are disposed in the second chamber at an angle α relative to a line perpendicular to the outer circumferential wall of the second chamber.

3. The turbocharger of claim 2 wherein the angle α between the plurality of vanes and the line perpendicular to the outer circumferential wall the second chamber is between +45° and −45°.

4. The turbocharger of claim 3 wherein the angle α between the plurality of vanes and the line perpendicular to the outer circumferential wall the second chamber is between +25° and −25°.

5. The turbocharger of claim 4 further including a catalyst assembly axially connected to the exhaust gas outlet of the turbine housing.

6. The turbocharger of claim 5 wherein the catalyst assembly includes a cylindrical shaped catalyst element having an exhaust gas inlet end and an exhaust gas outlet end and the exhaust gas inlet end is axially oriented with the second chamber and the exhaust gas outlet of the turbine housing.

7. The turbocharger of claim 1 wherein the surface that defines the turbine wheel passage is spaced radially outward from a center axis by a first distance, and each of the vanes extends radially inward to an end proximal to the axis, with each of the ends being spaced radially outward from the axis by a second distance that is greater than the first distance, and wherein the vanes are disposed downstream of the turbine wheel.

8. The turbocharger of claim 6 wherein the plurality of vanes are spaced from the catalyst element and are disposed upstream from the catalyst element.

9. A turbocharger for an internal combustion engine, the turbocharger comprising:
a compressor housing mounted to the internal combustion engine between a first and a second bank of cylinders of the internal combustion engine, and wherein the compressor housing includes a fresh air inlet, a compressed air outlet, and a compressor wheel;
a turbine housing axially connected to the compressor housing, and wherein the turbine housing includes an exhaust gas inlet, a first chamber receiving exhaust gas from the exhaust gas inlet, a surface defining a turbine wheel passage receiving exhaust gas from the first chamber, a turbine wheel disposed within the turbine wheel passage and propelled by the exhaust gas, a second chamber receiving exhaust gas from the turbine wheel passage, an exhaust gas outlet receiving exhaust gas from the second chamber, wherein the turbine housing includes an outer circumferential wall, an axially facing first wall, and an axially facing second wall opposite the first wall that define the second chamber in a toroidal shape;
a shaft connected to the compressor wheel and the turbine wheel for common rotation; and
a catalyst assembly axially connected to the exhaust gas outlet of the turbine housing;
wherein the turbine housing further includes at least first and second vanes surrounded by and connected to the outer circumferential wall, the first wall, and the second wall such that the plurality of vanes disrupt a rotational flow of exhaust gas in the second chamber for evenly flowing exhaust gas through the catalyst assembly.

10. The turbocharger of claim 9 wherein the first and second vanes of the second chamber are disposed in the second chamber at an angle α relative to a line perpendicular to the outer circumferential wall of the second chamber.

11. The turbocharger of claim 10 wherein the angle α between each of the first and second vanes and the line perpendicular to the outer circumferential wall of the second chamber is between +45° and −45°.

12. The turbocharger of claim 11 wherein the angle α between each of the first and second vanes and the line perpendicular to the outer circumferential wall of the second chamber is between +25° and −25°.

13. The turbocharger of claim 12 wherein the second chamber is disposed downstream of the turbine wheel.

14. The turbocharger of claim 13 wherein the catalyst assembly includes a cylindrical-shaped catalyst element having an exhaust gas inlet end and an exhaust gas outlet end and the exhaust gas inlet end is axially oriented with the second chamber and the exhaust gas outlet of the turbine housing.

15. The turbocharger of claim 9 wherein the surface that defines the turbine wheel passage is spaced radially outward from a center axis by a first distance, and each of the vanes extends radially inward to an end proximal to the axis, with each of the ends being spaced radially outward from the axis by a second distance that is greater than the first distance, and wherein the vanes are disposed downstream of the turbine wheel.

\* \* \* \* \*